US011901573B2

(12) United States Patent
Fees et al.

(10) Patent No.: US 11,901,573 B2
(45) Date of Patent: *Feb. 13, 2024

(54) NON-WELDING JOINDER OF EXTERIOR PLATES OF A BATTERY MODULE

(71) Applicant: American Battery Solutions, Inc., Lake Orion, MI (US)

(72) Inventors: Heiner Fees, Bietigheim-Bissingen (DE); Andreas Track, Sachsenheim (DE); Alexander Eichhorn, Eppingen (DE); Ralf Maisch, Abstatt (DE); Jörg Damaske, Freiberg (DE); Martin Eberhard, Woodside, CA (US)

(73) Assignee: AMERICAN BATTERY SOLUTIONS, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,084

(22) Filed: Nov. 9, 2017

(65) Prior Publication Data
US 2018/0138466 A1    May 17, 2018

Related U.S. Application Data

(60) Provisional application No. 62/422,111, filed on Nov. 15, 2016.

(51) Int. Cl.
    *H01M 50/258*    (2021.01)
    *H01M 50/171*    (2021.01)
    (Continued)

(52) U.S. Cl.
    CPC ....... *H01M 50/258* (2021.01); *H01M 50/171* (2021.01); *H01M 50/224* (2021.01);
    (Continued)

(58) Field of Classification Search
    CPC ............. H01M 2/0245; H01M 2/0242; H01M 2/0217; H01M 10/0217; H01M 10/052;
    (Continued)

(56) References Cited

U.S. PATENT DOCUMENTS 5,436,088 A * 7/1995 Castaneda ........... H01M 2/1055
                                                     429/123
6,631,775 B1 * 10/2003 Chaney .................... B60K 1/04
                                                     180/68.5
(Continued)

FOREIGN PATENT DOCUMENTS

CA        840806 A      5/1970
CN       2445440 Y      8/2001
(Continued)

OTHER PUBLICATIONS

International Search Report and Written Opinion dated Jan. 24, 2018 in International Application No. PCT/US2017/061260.
(Continued)

*Primary Examiner* — Lisa S Park
(74) *Attorney, Agent, or Firm* — FINNEGAN, HENDERSON, FARABOW, GARRETT & DUNNER, LLP (57) ABSTRACT

In an embodiment, a battery module is configured for insertion into a battery module compartment of an energy storage system. The battery module includes a first exterior plate configured with a male joining section, a second exterior plate that is adjacent to the first exterior plate and configured with a female joining section, wherein the first and second exterior plates are joined together via the male and female joining sections without welding. In an example, by joining the first and second exterior plates (e.g., and optionally, other exterior plates of the battery module as well) without welding, problems associated with heat from a welding process as well as spatters and dirt accumulation
(Continued)

at battery cells of the battery module can be reduced or avoided.

15 Claims, 10 Drawing Sheets

(51) Int. Cl.
    *H01M 50/278*     (2021.01)
    *H01M 50/276*     (2021.01)
    *H01M 50/262*     (2021.01)
    *H01M 50/227*     (2021.01)
    *H01M 50/224*     (2021.01)

(52) U.S. Cl.
    CPC ....... *H01M 50/227* (2021.01); *H01M 50/262* (2021.01); *H01M 50/276* (2021.01); *H01M 50/278* (2021.01); *H01M 2220/20* (2013.01)

(58) Field of Classification Search
    CPC ............. H01M 50/258; H01M 50/147; H01M 50/166; H01M 50/171; H01M 2220/20; H01M 50/224; H01M 50/227; H01M 50/262; H01M 50/276; H01M 50/278; Y02E 60/10
    See application file for complete search history.

(56) References Cited

U.S. PATENT DOCUMENTS

| | | | |
|---|---|---|---|
| 8,146,694 B2 * | 4/2012 | Hamidi | B60L 50/64 180/68.5 |
| 2001/0000945 A1 | 5/2001 | Watson et al. | |
| 2004/0102096 A1 | 5/2004 | Lim | |
| 2010/0323226 A1 | 12/2010 | Kim | |
| 2011/0045335 A1 * | 2/2011 | Lee | H01M 50/509 429/153 |
| 2011/0143193 A1 * | 6/2011 | Ahn | H01M 10/052 429/176 |
| 2014/0106211 A1 | 4/2014 | Lee et al. | |
| 2017/0005371 A1 | 1/2017 | Chidester et al. | |

FOREIGN PATENT DOCUMENTS

| | | | |
|---|---|---|---|
| CN | 201444484 U | | 4/2010 |
| CN | 103253119 A | | 8/2013 |
| CN | 104332571 A | | 2/2015 |
| CN | 105480070 | * | 4/2016 |
| CN | 105480070 A | * | 4/2016 |
| DE | 2014226566 | * | 4/2016 |
| DE | 2014226566 B3 | * | 4/2016 |
| JP | 2001118549 | * | 4/2001 |
| JP | 2001118549 A | * | 4/2001 |
| WO | 2017132575 A1 | | 8/2017 |

OTHER PUBLICATIONS

Written Opinion of the International Preliminary Examining Authority dated Nov. 5, 2018 in International Application No. PCT/US2017/061260.

* cited by examiner

NON-WELDING JOINDER OF EXTERIOR PLATES OF A BATTERY MODULE

CROSS-REFERENCE TO RELATED APPLICATIONS

The present application for patent claims the benefit of U.S. Provisional Application No. 62/422,111, entitled "MODULE HOUSING MANUFACTURING BY DEFORMED METALS", filed Nov. 15, 2016, which is assigned to the assignee hereof and hereby expressly incorporated by reference herein in its entirety.

BACKGROUND

1. Field of the Disclosure

Embodiments relate to non-welding joinder of exterior plates of a battery module.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

In an embodiment, a battery module is configured for insertion into a battery module compartment of an energy storage system. The battery module includes a first exterior plate configured with a male joining section, a second exterior plate that is adjacent to the first exterior plate and configured with a female joining section, wherein the first and second exterior plates are joined together via the male and female joining sections without welding. In an example, by joining the first and second exterior plates (e.g., and optionally, other exterior plates of the battery module as well) without welding, problems associated with heat from a welding process as well as spatters and dirt accumulation at battery cells of the battery module can be reduced or avoided.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1:
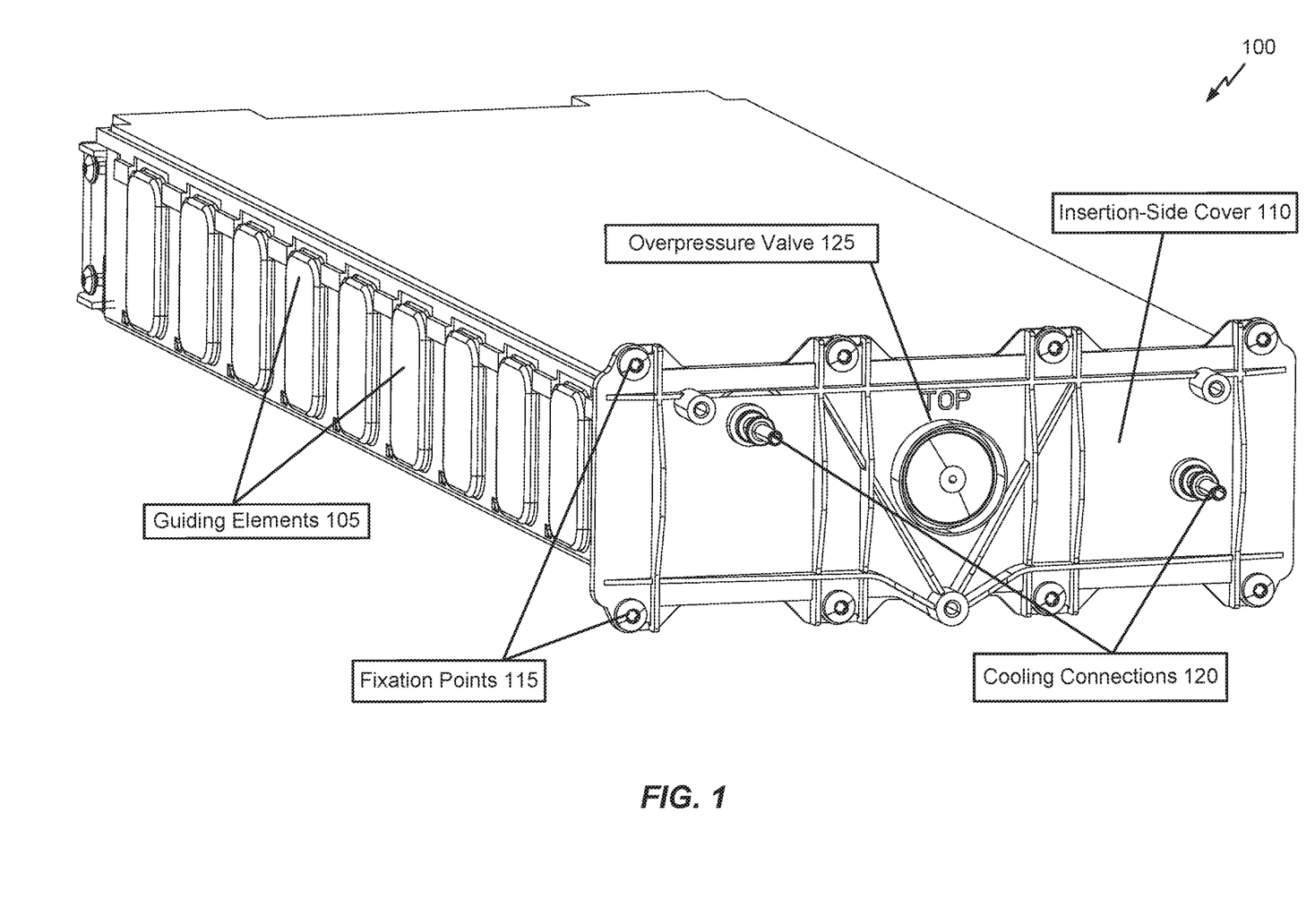
FIG. 1 illustrates a front-perspective of an exterior frame of a battery module in accordance with an embodiment of the disclosure.
Figure 2A:
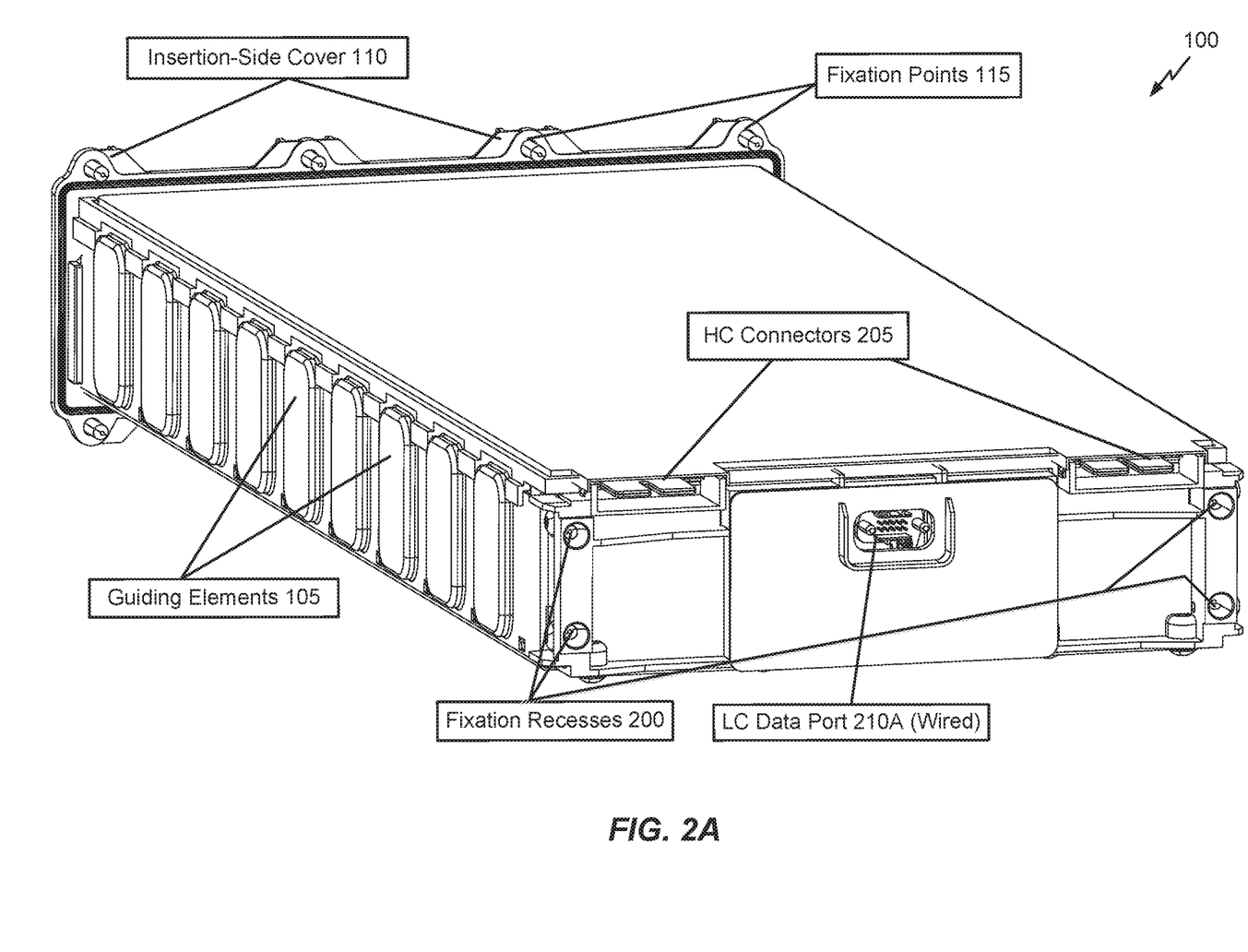
FIGS. 2A-2B illustrates alternative rear-perspectives of the exterior frame of the battery module of FIG. 1 in accordance with an embodiment of the disclosure.
Figure 2B:
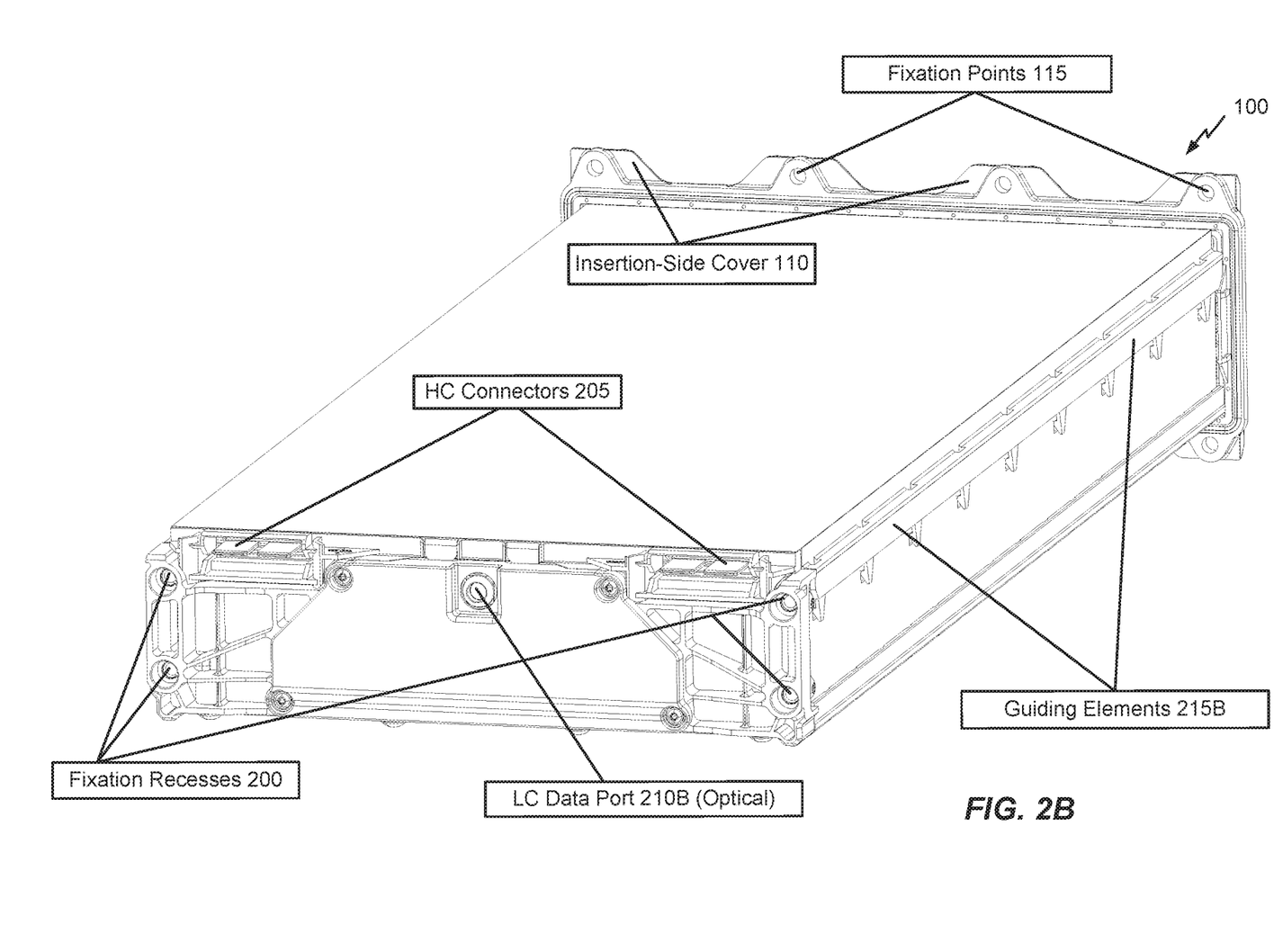

FIG. 1 illustrates a front-perspective of an exterior frame of a battery module 100 in accordance with an embodiment of the disclosure. FIGS. 2A-2B illustrate alternative rear-perspectives of the exterior frame of the battery module 100 in accordance with embodiments of the disclosure. In the examples of FIGS. 1-2B, the battery module 100 is configured for insertion into a battery module compartment. For example, in FIGS. 1-2B, each side of the battery module 100 includes guiding elements 105 or 215B to facilitate insertion into (and/or removal out of) the battery module compartment. In a further example, the guiding elements 105 or 215B are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, etc.) to seal the battery module 100 inside the battery module compartment using a cover (or endplate) integrated sealing system (e.g., rubber ring, paper gasket, sealant adhesive, etc.). While the insertion-side cover 110 is depicted in FIGS. 1-2B as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIGS. 1-2B, the insertion-side cover 110 includes fixation points 115 provisioned on a flange, a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100). The set of cooling connections 120 may include a cooling tube inlet and a cooling tube outlet for a cooling tube that is arranged inside of the battery module 100.

In an alternative embodiment, the fixation points 115 and associated flange can be omitted, and a different fixation mechanism (e.g., a clip or clamping mechanism) can be used to secure the battery module 100 inside a respective battery module compartment.

Referring to FIGS. 2A-2B, the battery module 100 further includes a set of fixation recesses 200 (e.g., to position and secure the battery module 100 in the battery module compartment while inserted), and a set of high current (HC) connectors 205 (e.g., corresponding to positive and negative terminals of the battery module 100, each of which may be connected, via bolting, screwing or plugging, to an electrical interface that is coupled to either the BJB or another battery module). In FIG. 2A, the battery module includes a wired HC data port 210A (e.g., to connect internal sensors of the battery module 100 to the BJB (not shown in FIG. 2A) via a wired LC module-to-tunnel interface (not shown in FIG. 2A) in the battery module compartment). In FIG. 2B, the battery module includes an optical LC data port 210B (e.g., to connect internal sensors of the battery module 100 to the BJB (not shown in FIG. 2B) via an optical LC module-to-tunnel interface (not shown in FIG. 2B) in the battery module compartment, such as a light tube). In an example, the optical LC data port 210B, upon insertion of the battery module 100 into the battery module compartment, may be pressed against the optical LC module-to-tunnel interface (not shown in FIG. 2B) so that optical signals can be exchanged with the BJB through light tube(s) in the tunnel space without collecting dust or other debris. Accordingly, the battery module 100 is configured such that, upon insertion into the battery module compartment, the HC connectors 205 and the LC data port 210A or 210B are each secured and connected (e.g., plugged into, or pressed against and sealed) corresponding connectors in the battery module compartment. As used herein, reference to "LC" and "HC" is generally used to distinguish between data connections (i.e., LC) and power connections (i.e., HC). Generally, power connections are associated with higher currents and/or voltages (e.g., suitable for powering a drive motor of an electric vehicle), while data connections are associated with lower currents and/or voltages (e.g., suitable for transporting data, although low-power loads may also be supported, such as a Universal Serial Bus (USB) charging load).

In conventional battery modules, an exterior frame is constructed from plates (e.g., a top plate, side plates, front and rear endplates, and a bottom plate) that are formed from a metallic material (e.g., aluminum or steel). These plates may be joined via welding or gluing. In particular, welding may be used to join adjacent plates together for implementations where the battery module is required to maintain structural integrity in response forces due to battery cell swelling. However, welding of the plates may cause detrimental effects arising from the heat of the welding process, as well as various spatters and dirt accumulation at the battery cells. Accordingly, there is a high risk of manufacturing-based damage to the battery cells if welding is used to join the plates together.

Embodiments of the disclosure described herein relate to joinder of exterior plates (e.g., a top plate, side plates, front and rear endplates, and a bottom plate) of a battery module. In particular, adjacent plates of the battery module are joined together using a non-welding process, such as male and female joining sections that are joined (e.g., coupled) to each other, to avoid or at least mitigate the above-noted problems associated with the welding process while still maintaining strong structural integrity for the battery module.

Figure 3:
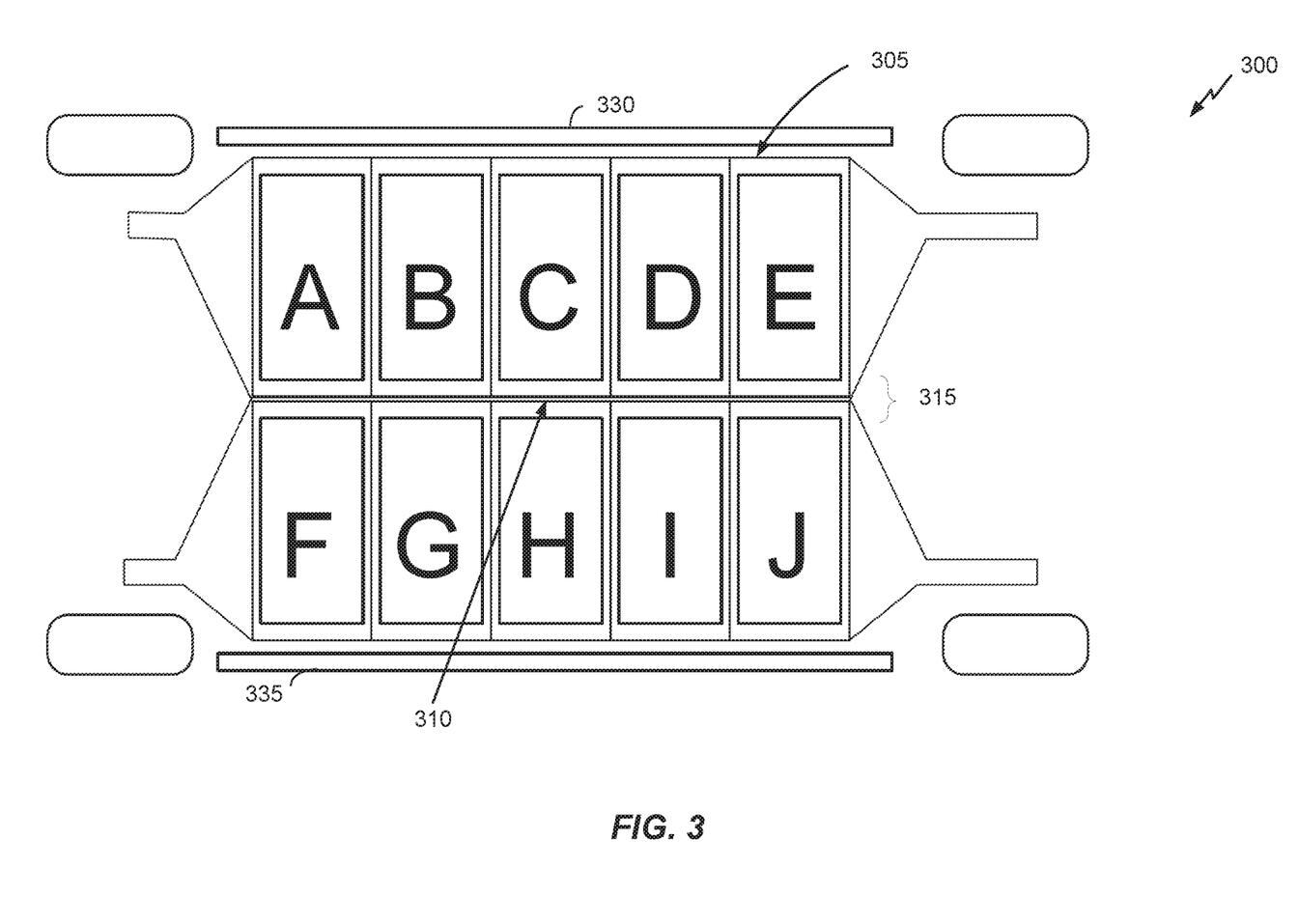
FIG. 3 illustrates a top-perspective of a cross-section of an electric vehicle including a battery housing in accordance with an embodiment of the disclosure.

FIG. 3 illustrates a top-perspective of a cross-section of an electric vehicle 300 including a battery housing 305 in accordance with an embodiment of the disclosure. FIG. 3 depicts various well-known components (e.g., wheels, axles, etc.) of the electric vehicle 300 to provide general context, but these components are not described in detail below for the sake of brevity. With respect to FIG. 3 and other FIGS described below, reference to battery "housing" and battery "module mounting area" is somewhat interchangeable. The battery module mounting area in FIG. 3 (and other FIGS described below) refers to an arrangement of battery module compartments configured to receive insertion of battery modules and to be sealed via insertion-side covers to form a battery housing. Further, in at least one embodiment, the battery module mounting area is part of a floor of the electric vehicle 300.

Referring to FIG. 3, the battery housing 305 includes ten battery module compartments denoted as A . . . J, and a middle bar 310 that is positioned between battery module compartments A . . . E and battery module compartments F . . . J on different longitudinal sides of the electric vehicle 300. Each battery module compartment includes a frame (or plurality of walls) defining an interior space configured to fit a respective battery module, and an insertion-side which may be opened to facilitate insertion and/or removal of the respective battery module. The middle bar 310 may be constructed from the dividers (or firewalls) that separate laterally adjacent (e.g., aligned width-wise as a left/right pairing in the electric vehicle 300) battery module compartments A . . . J (e.g., the firewall between battery module compartments A and F, the firewall between battery module compartments B and G, etc.).

In an example, the middle bar 310 may be one single longitudinal "bar" that extends across the entirety of the battery housing 305. In this case, the interior side-walls of each battery module compartment may be attached to the middle bar 310 to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area. In this case, the middle bar 310 is an aggregation of the individual firewalls contained in each respective battery module compartment chamber across the battery housing 305.

While the middle bar 310 is illustrated in FIG. 3 as being centered in the battery housing 305, the middle bar 310 can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules when inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 305), with the two separate middle bars either corresponding to two long "bars" extending across the battery housing 305 or two aggregations of chamber-specific firewalls from longitudinally stacked battery module compartment chambers. In at least one embodiment, the gap between the two separate middle bars may be used as a tunnel space (e.g., to facilitate optical communication, to run LC/HC busbars, etc.), although the embodiments describe below relate to an implementation where the tunnel space is defined above the battery module compartments, and not in a gap between laterally adjacent battery module compartments.

It will be appreciated that the battery housing 305 including ten battery module compartments A . . . J is shown in FIG. 3 for example purposes only. For example, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.). The battery module compartments A . . . E are arranged longitudinally (i.e., lengthwise with respect to electric vehicle 300) on a right-side of the electric vehicle 300, while battery module compartments F . . . J are arranged longitudinally on a left-side of the electric vehicle 300.

As used herein, a "battery module" is a package that contains a plurality of battery cells, such as lithium ion battery cells or battery cells made from a different electrode material. Battery modules may be configured with a prismatic or pouch battery cell arrangement (sometimes referred to as a soft pack), while other battery modules are configured with a cylindrical battery cell arrangement.

As used herein, a battery module compartment being "sealed" refers to a seal that is at least water-tight or liquid-tight, and optionally gas-tight (at least, with respect to certain gases such as smoke from fire, carbon, electrolyte particles, dust and debris, etc.). Generally, the sealing of the battery module compartments is a result of its interior walls being welded or glued together (where possible), and any connection interfaces (e.g., insertion-side cover, coolant interface plugs, electrical interface connectors, etc.) being sealed with a suitable type of sealant (e.g., O-ring, rubber gasket, sealing compound, etc.). Accordingly, the sealing of the battery module compartments may be configured to block propagation of likely contaminants (e.g., liquids such as water, flames and/or smoke from fires, carbon, electrolyte particles, dust and debris, etc.) from entering into battery module compartments from an external environment and/or from exiting the battery module compartments towards a protected area (e.g., a passenger cabin of an electric vehicle). Moreover, while various embodiments described below relate to lateral or side-insertion of battery modules into respective battery module compartments, the insertion-side for the battery module compartments A . . . J may vary between different battery module mounting area configurations.

The battery housing 305 described above with respect to FIG. 3 may be based on various battery module mounting area configurations, such as a lateral-inserted battery module mounting area configuration (e.g., battery modules are inserted into a battery module mounting area from the left and right sides of an electric vehicle) which is used to describe various embodiments below. However, while not expressly illustrated, other battery module mounting area configurations are possible, such as vertically-inserted battery module mounting area configurations (e.g., battery modules are inserted into a battery module mounting area from the top or bottom sides of an electric vehicle), hinged-inserted battery module mounting area configurations (e.g., battery module compartments are attached to hinges so that the battery module compartments rotate upwards and downwards via the hinges for battery module insertion), and so on.

Figure 4A:
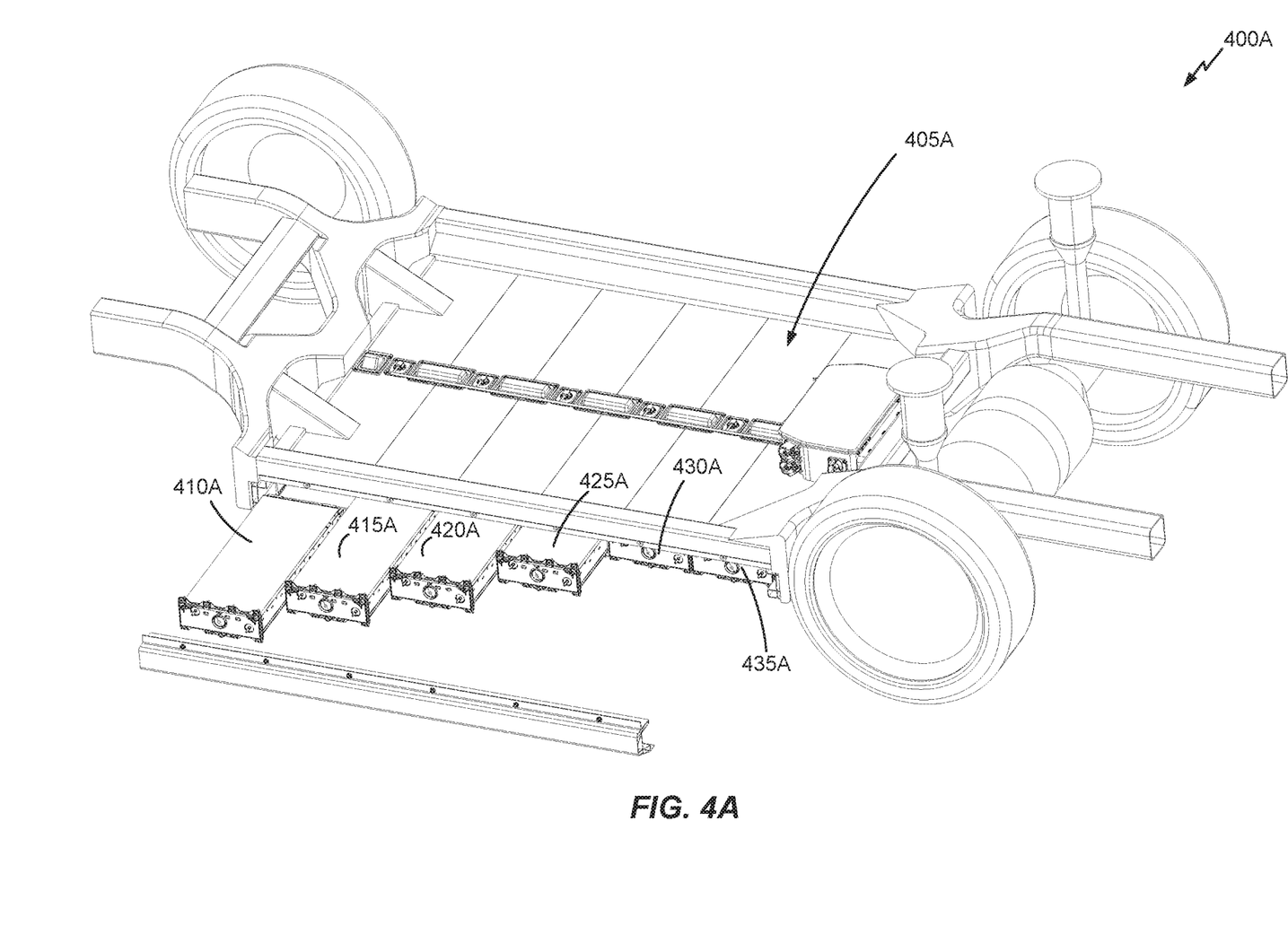
FIG. 4A illustrates an example of an electric vehicle including a battery module mounting area in accordance with an embodiment of the disclosure.

FIG. 4A illustrates an example of an electric vehicle 400A including a battery module mounting area 405A in accordance with an embodiment of the disclosure. Referring to FIG. 4A, the battery module mounting area 405A is configured similarly to the battery housing 305 in FIG. 3. Various battery modules 410A-435A are depicted at various degrees of insertion into the battery module mounting area 405A. Upon insertion, fixation recesses on the battery modules 410A-435A may be aligned with corresponding fixation pins on the middle bar 310, which helps to secure the battery modules 410A-435A inside their respective battery module compartments. Each of the battery modules 410A-435A is further shown as including an insertion-side cover. Once inserted, the insertion-side cover may be secured to the battery module mounting area 405A (e.g., by screwing or bolting), which helps to maintain each battery module's fixation pins inside each respective battery module's fixation recesses during operation of the electric vehicle 400A.

Figure 4B:
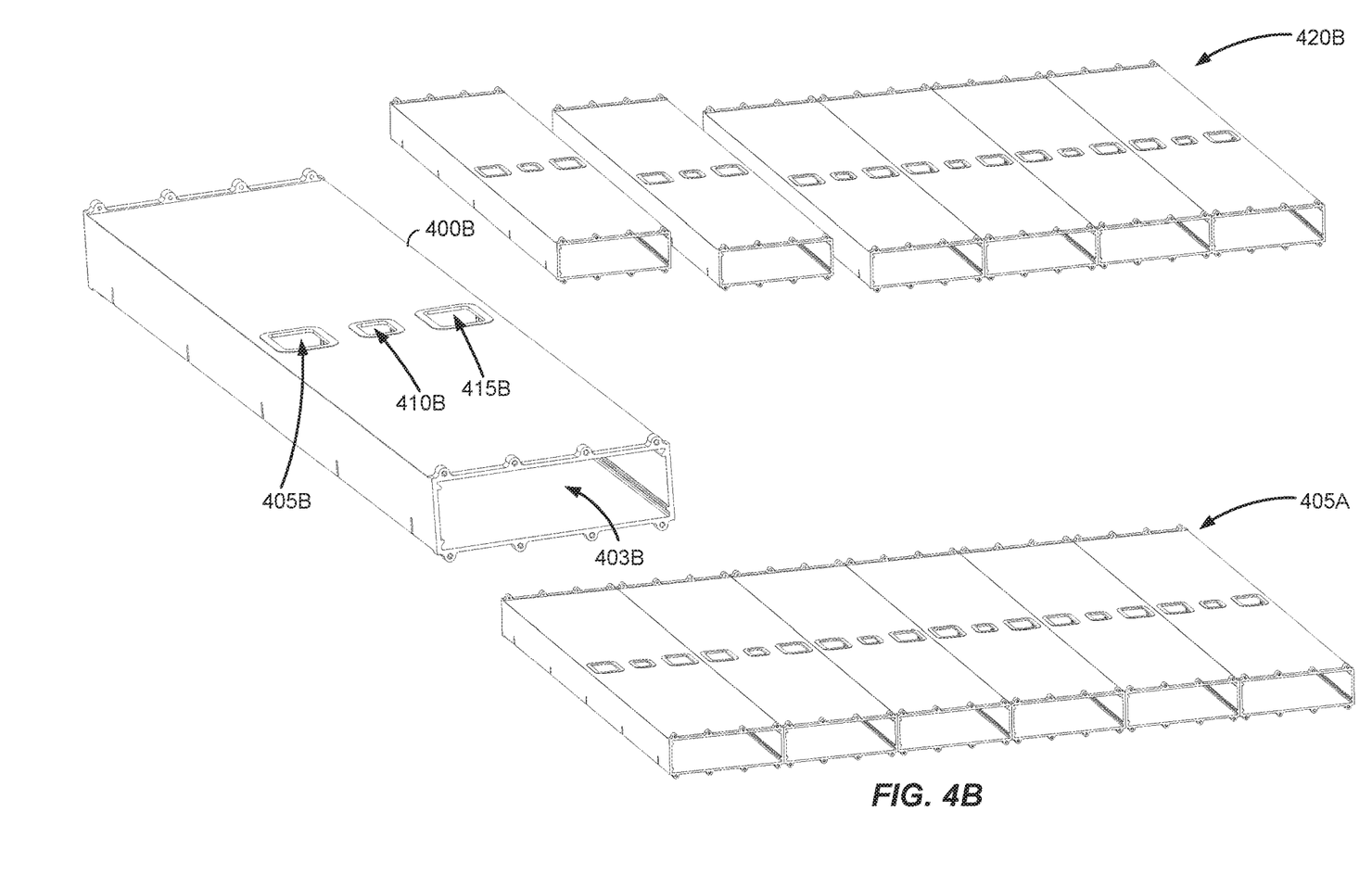
FIG. 4B illustrates example construction of a lateral-inserted battery module mounting area configuration in accordance with an embodiment of the disclosure.

FIG. 4B illustrates example construction of a lateral-inserted battery module mounting area configuration in accordance with an embodiment of the disclosure. In FIG. 4B, A battery module mounting area 405A is shown as being constructed from a series of battery module compartment chambers 400B. Each battery module compartment chamber 400B is configured with a battery module compartment on each side as a paired battery module compartment arrangement, with each battery module compartment configured to receive a respective battery module. The battery module compartment chamber 400B includes a plurality of exterior walls that define an exterior frame of the battery module compartment chamber 400B, and at least one interior wall (not shown in FIG. 4B) that acts as a firewall between the respective battery module compartments of the battery module compartment chamber 400B and separates (and forms a seal with respect to) the respective battery module compartments. In particular, the at least one interior wall (or firewall) may help to fix the respective battery modules into a desired position upon insertion, to protect each respective battery module compartments from hazards in the other battery module compartment, guide crash forces, support connectors for LC and/or HC interfaces and/or reduce a risk that the battery housing itself will collapse. In an example, the battery module compartment chamber 400B may include at least one interior wall to seal the respective battery module compartments from each other while defining a tunnel space located above the battery housing). Further, in an example, each interior wall of the battery module compartment chamber 400B may be comprised of a single sheet of sheet metal or a sandwich of sheet metal.

Referring to FIG. 4B, an insertion-side (or opening) 403B is shown on one particular exterior-facing side of the battery module compartment chamber 400B. While not shown explicitly in FIG. 4B, an identical insertion-side is arranged on the opposing exterior-facing side of the battery module compartment chamber 400B. The respective insertion-sides are each configured to permit respective battery modules to be inserted into the respective interior spaces of the respective battery module compartments which are part of the battery module compartment chamber 400B. In an example, each respective insertion-side of the battery module compartment chamber 400B is configured to be closed via respective lateral insertion-side covers so that each battery module compartment in the battery module compartment chamber 400B is sealed from the other battery module compartment. Because each battery module compartment chamber 400B may be stacked longitudinally with respect to the electric vehicle as shown at 420B, the two battery module compartments in each particular battery module compartment chamber 400B are considered to be laterally paired (e.g., left-side and right-side paired battery module compartments at the same longitudinal location along the battery module mounting area).

In FIG. 4B, holes 405B, 410B and 415B are configured under the tunnel space. In an example, a paired HC connector component may be inserted into each of the holes 405B and 415B to electrically couple the respective battery modules to HC busbars, and a pair of LC module-to-tunnel interfaces may be inserted into the hole 410B to communicatively couple an LC communications interface (e.g., an LC busbar or optical communications interface) to LC data ports of the respective battery modules. The respective battery module compartment chambers 400B may be connected (or stacked) side-by-side longitudinally in series (e.g., via welding, gluing, etc.) as shown at 420B to construct the battery module mounting area 405A. In an example, each battery module compartment chamber 400B may be independently constructed separate from the actual assembly of the battery module mounting area, and then attached together during the assembly to quickly assemble the battery module mounting area.

Figure 5A:
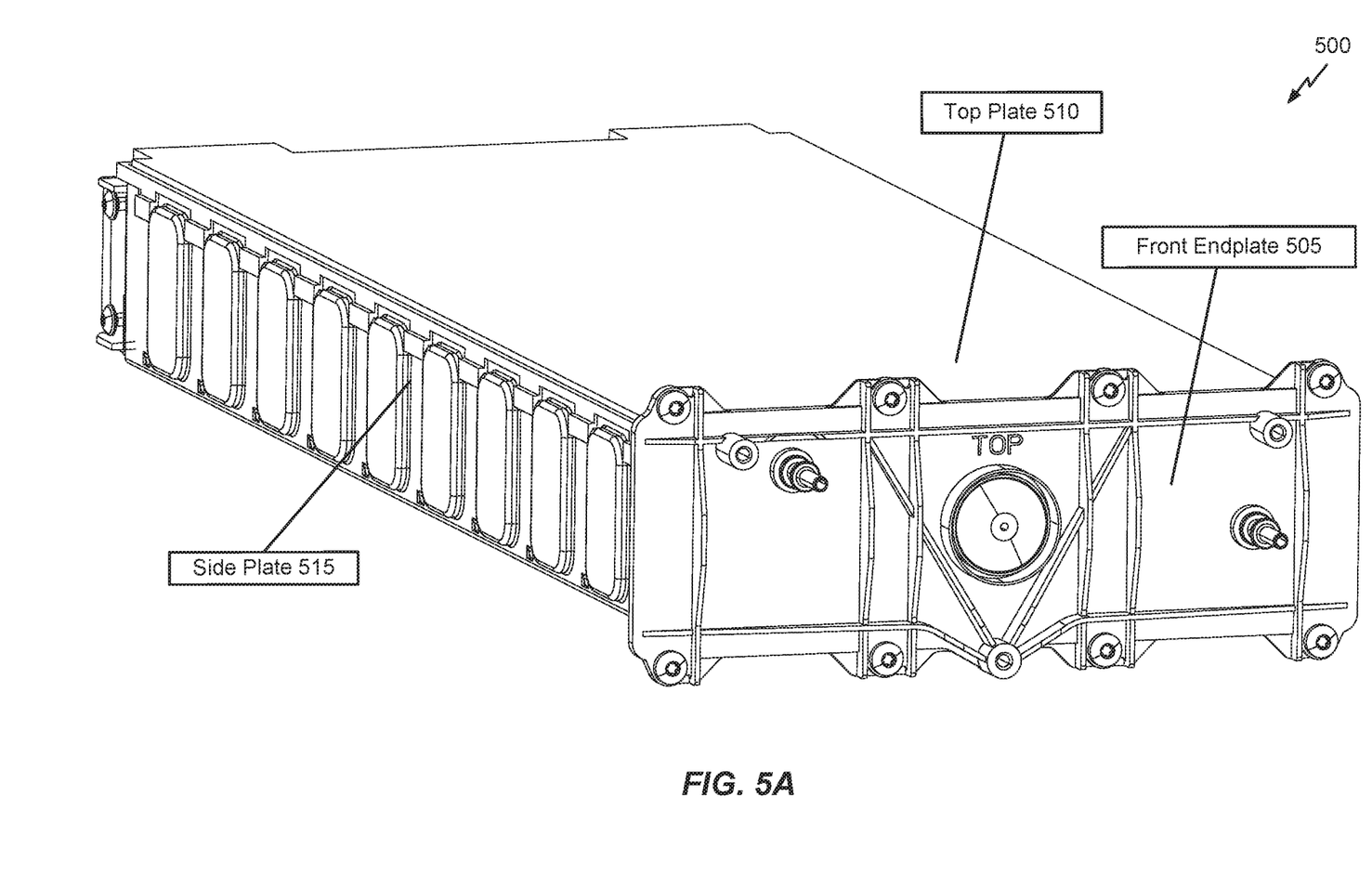
FIGS. 5A-5C illustrate front and alternative rear perspectives of the exterior frame of a battery module in accordance with embodiments of the disclosure.
Figure 5B:
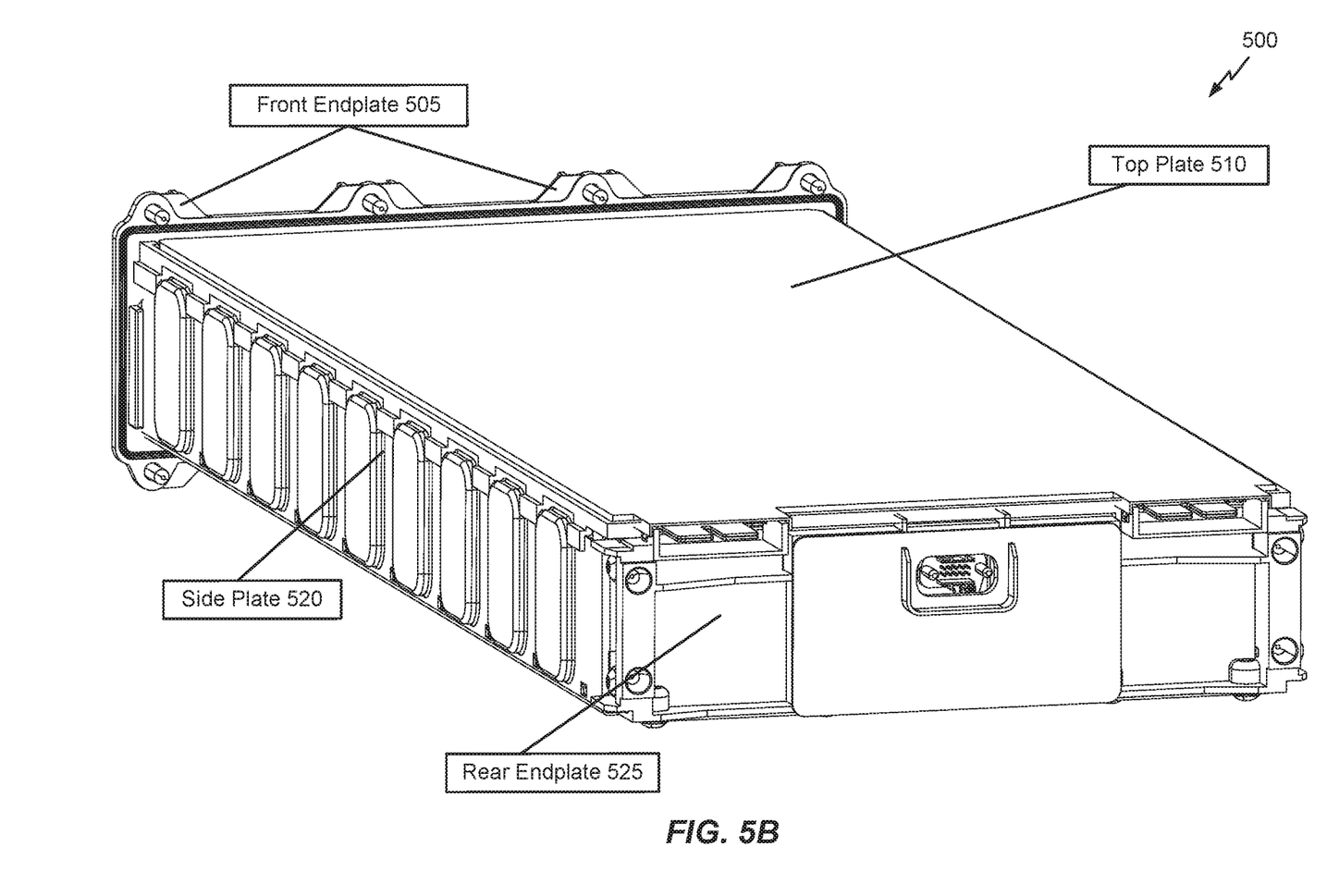
Figure 5C:
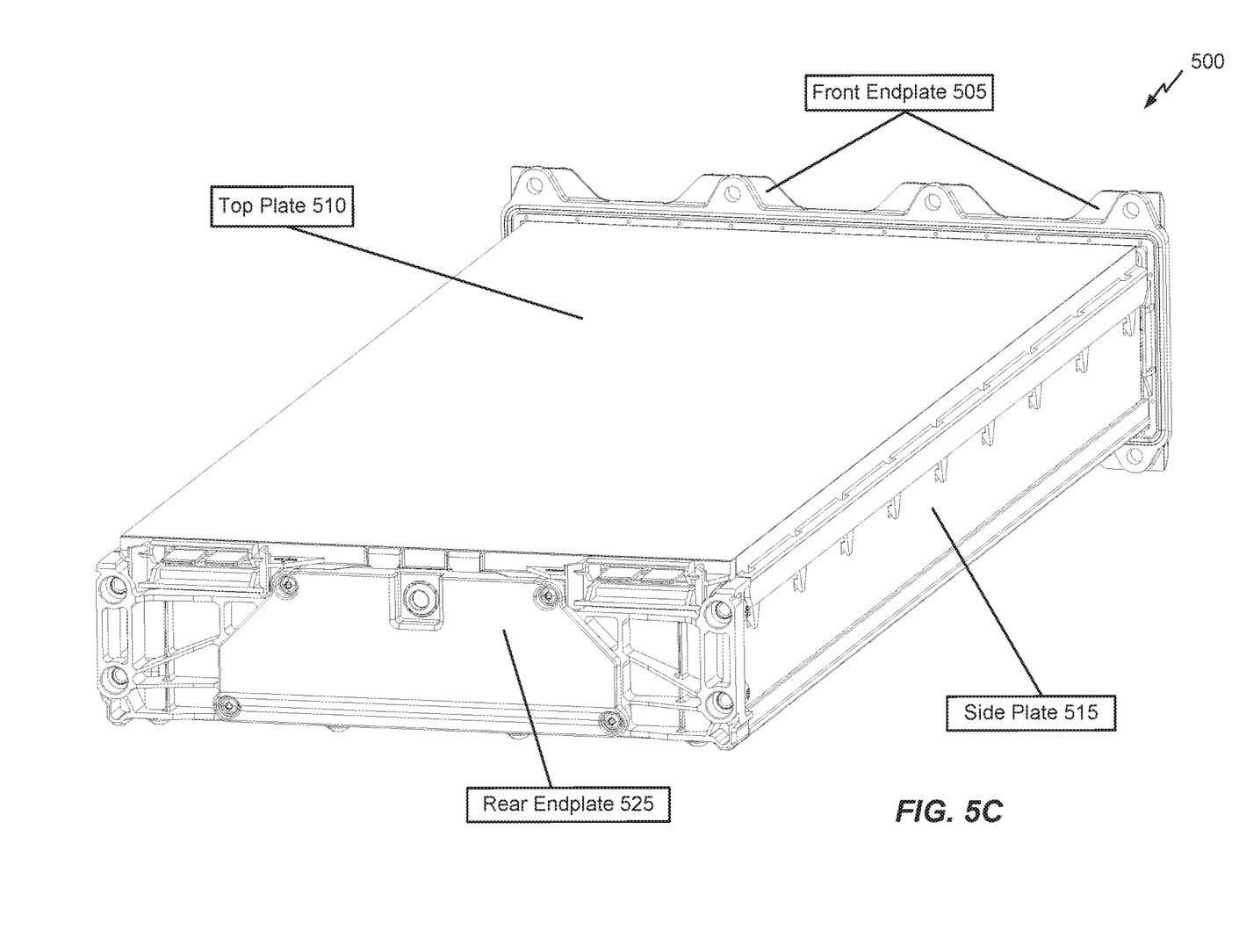

FIGS. 5A-5C illustrate front and alternative rear perspectives of the exterior frame of a battery module 500 in accordance with embodiments of the disclosure. The battery module 500 of FIGS. 5A-5C substantially corresponds to the battery module 100 as depicted in FIGS. 1-2B, respectively, except that the exterior plates that form the exterior frame of the battery module 500 are marked more specifically in FIGS. 5A-5C, while the components already descried above with respect to FIGS. 1-2B are not marked.

Referring to FIG. 5A, from a front perspective, a front endplate 505, a top plate 510 and a side plate 515 are visible. In an example, the front endplate 505 is also configured as the insertion-side cover 110 as described above with respect to FIGS. 1-2B. Unlike the other plates of the battery module 500, once the battery module 500 is installed inside a battery module mounting area to form a battery housing, the front endplate 505 becomes an integrated exterior frame part of the battery housing (e.g., an exterior wall of the battery module compartment into which the battery module 500 is inserted). By contrast, once the battery module 500 is installed inside a battery module mounting area to form a battery housing, the other plates (e.g., bottom plate, rear endplate, side plates and top plate) of the battery module are encapsulated by the battery module compartment of the battery housing without being integrated as exterior walls of the battery module compartment.

Referring to FIG. 5B, from a rear perspective where the battery module 500 includes a wired HC data port, the front endplate 505, the top plate 510, a side plate 520, and a rear endplate 525 are visible. Referring to FIG. 5C, from a rear perspective where the battery module 500 includes an optical LC data port, the front endplate 505, the top plate 510, the side plate 515 (e.g., configured with guiding elements 215B instead of guiding elements 105 as described above with respect to FIG. 2B), and the rear endplate 525 are visible. While not shown expressly in FIGS. 5A-5C, the battery module 500 further includes a bottom plate.

Figure 6:
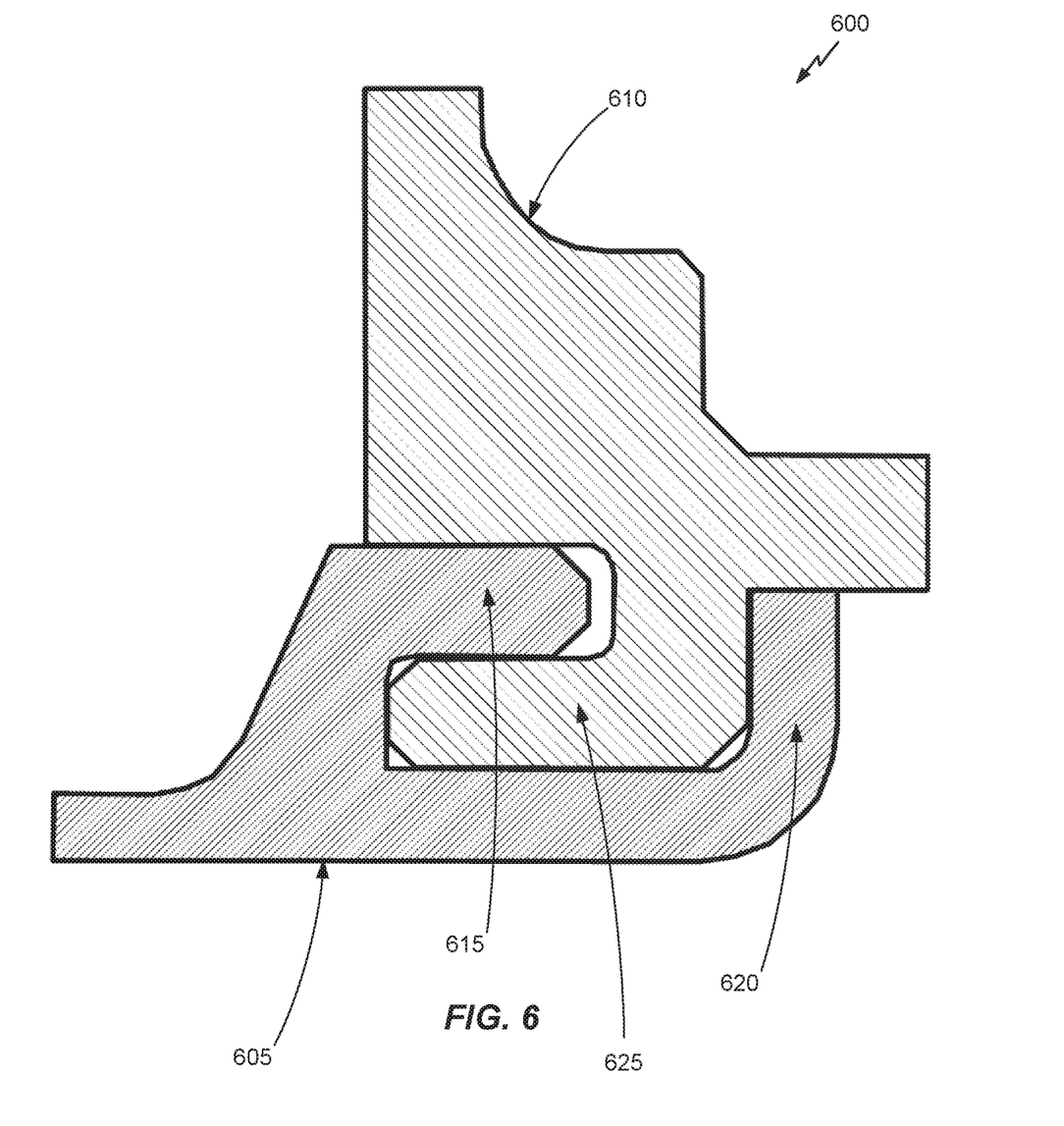
FIG. 6 illustrates a plate-to-plate joining interface whereby sections of respective plates are joined together without welding in accordance with an embodiment of the disclosure.

FIG. 6 illustrates a plate-to-plate joining interface 600 whereby sections of respective plates are joined together without welding in accordance with an embodiment of the disclosure. In particular, a female joining section 605 of a first plate is joined with (e.g., clamped to) a male joining section 610 of a second plate. More specifically, the female joining section 605 and the male joining section 610 are integrated into adjacent plates of the battery module 500. The female joining section 605 includes bent portions 615-620 which defines a cavity into which a bent portion 625 of the male joining section 610 is inserted.

Referring to FIG. 6, in an example, during assembly of the battery module 600, a first plate configured with the female joining section 605 may be constructed with a width or length that is oversized. In particular, the female joining section 605 at this point is flat and does not yet include the bent portion 620. Next, the male joining section 610 on a second plate is aligned with the female joining section 605 on the first plate. Once aligned, an edge or end of the first plate is deformed by rolling or crimping (e.g., using a crimping tool) to form the bent portion 620. At this point, the bent portion 625 is effectively locked inside the cavity defined between the bent portions 615-620. In an example, this crimping process may be performed at each edge of the first plate concurrently or successively.

In an alternative example, one or more of the plates may be made from plastic. A plastic plate may be configured with the bent portion 620 from casting instead of rolling or crimping. If plastic is used, the bent portion 625 can be forced into the cavity defined between the bent portions 615-620 based on the higher flexibility of plastic relative to metallic materials. In one example, the top plate 510 may be formed from plastic to increase electrical insulation (e.g., based on high amounts of current and/or voltage from battery cells being in close proximity to a top of the battery module 500), while the other plates are formed from a metallic material (e.g., aluminum or steel).

Referring to FIG. 6, in a further embodiment, a curing material (e.g., an epoxy resin material, such as single component glue or 2-component glue) is arranged between the male joining section 610 and the female joining section 605. For example, the curing material may be applied to the male joining section 610 and/or the female joining section 605 before being joined together, after which the curing material cures inside of a gap between the male joining section 610 and the female joining section 605.

The manner in which the female/male joining section arrangements between the adjacent plates are configured can vary by implementation, as will be understood from the following examples.

In one exemplary implementation, the male joining section 610 and the female joining section 605 are used along the lateral edges of the battery module 500. For example, the top plate 510 and bottom plate (not shown) may include the female joining section 605 along their lateral edges while the side plates 515-520 each include the male joining section 610 at their respective top and bottom lateral edges aligned with respective lateral edges of the top plate 510 and bottom plate (not shown). Alternatively, this arrangement can be reversed, with the top plate 510 and bottom plate (not shown) having the male joining section 610 in alignment with the female joining section 615 on the side plates 515-520. Alternatively, the top plate 510 may use the male joining section 610 on its lateral edges while the bottom plate (not shown) uses the female joining section 605 on its lateral edges (or vice versa), with the side plates 515-520 having different joining section types at top and bottom lateral edges.

In another exemplary implementation, the male joining section 610 and the female joining section 605 are used along the longitudinal edges of the battery module 500. For example, the top plate 510 and bottom plate (not shown) may include the female joining section 605 along their longitudinal edges while the front endplate 505 and the rear endplate 525 each include the male joining section 610 at their respective top and bottom longitudinal edges aligned with respective longitudinal edges of the top plate 510 and bottom plate (not shown). Alternatively, this arrangement can be reversed, with the top plate 510 and bottom plate (not shown) having the male joining section 610 in alignment with the female joining section 615 on the other plates. Alternatively, the top plate 510 may use the male joining section 610 on its longitudinal edges while the bottom plate (not shown) uses the female joining section 605 on its longitudinal edges (or vice versa), with the other plates having different joining section types at top and bottom lateral edges.

In yet another exemplary implementation, the male joining section 610 and the female joining section 605 are used along the vertical edges of the battery module 500. For example, the side plates 515-520 may include the female joining section 605 along their vertical edges while the front endplate 505 and the rear endplate 525 each include the male joining section 610 at their respective left and right vertical edges aligned with respective vertical edges of the side plates 515-520. Alternatively, this arrangement can be reversed, with the side plates 515-520 having the male joining section 610 in alignment with the female joining section 615 on the other plates. Alternatively, the side plate 515 may use the male joining section 610 on its vertical edges while the side plate 520 uses the female joining section 605 on its vertical edges (or vice versa), with the other plates having different joining section types at top and bottom lateral edges.

As will be appreciated, the female/male joining section arrangements may be used to join any adjacent plates in the battery module 500 (e.g., top or bottom plate to side plate, top or bottom plate to front or rear endplate, side plate to front or rear endplate). Moreover, these female/male joining section arrangements may be used either together or separate, such that it is possible that all plates are joined with all adjacent plates using a female/male joining section arrangement along each of their respective edges.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. A battery module configured for insertion into a battery module compartment of an energy storage system, the battery module comprising:
   a first exterior plate configured with a male joining section arranged at a first edge of the first exterior plate;
   a second exterior plate that is adjacent and substantially perpendicular to the first exterior plate and configured with a female joining section arranged at a second edge of the second exterior plate; and
   at least one data port configured to connect to at least one corresponding data port of the battery module compartment, upon insertion of the battery module into the battery module compartment, to place the battery module in communication with a battery junction box (BJB),
   wherein the first and second exterior plates are joined together via the male and female joining sections without welding,
   wherein the first and second exterior plates are arranged on different sides of an exterior frame of the battery module, and
   wherein, upon insertion of the battery module into the battery module compartment, the first and second exterior plates of the battery module are encapsulated within the battery module compartment with the battery module compartment comprising at least a liquid-tight seal and without the first and second exterior plates being integrated as exterior walls of the battery module compartment.

2. The battery module of claim 1, wherein the first exterior plate is metallic.

3. The battery module of claim 1, wherein the first exterior plate is formed from plastic.

4. The battery module of claim 3, wherein the second exterior plate corresponds to a top plate of the battery module.

5. The battery module of claim 1, wherein the second exterior plate is metallic.

6. The battery module of claim 5, wherein a cavity defined at an edge of the female joining section is arranged so as to lock in a bent portion of the male joining section.

7. The battery module of claim 1, wherein the second exterior plate is formed from plastic.

8. The battery module of claim 7, wherein a bent portion of the male joining section is forced into a cavity defined in the female joining section to lock the male joining section to the female joining section.

9. The battery module of claim 7, wherein the second exterior plate corresponds to a top plate of the battery module.

10. The battery module of claim 1, wherein a curing material is arranged between the male joining section and the female joining section.

11. The battery module of claim 10,
wherein the curing material is applied to one or more of the male joining section and the female joining section before being joined together, and
wherein the curing material cures inside of a gap between the male joining section and the female joining section after being joined together.

12. The battery module of claim 1,
wherein the first and second exterior plates are included among a set of plates that collectively comprise the exterior frame of the battery module, and
wherein the set of plates includes a bottom plate, a front endplate, a rear endplate, two side plates and a top plate.

13. The battery module of claim 12,
wherein, upon insertion of the battery module into the battery module compartment, the front endplate is integrated as an exterior wall of the battery module compartment, and
wherein, upon insertion of the battery module into the battery module compartment, the bottom plate, the rear endplate, the two side plates and the top plate are encapsulated by the battery module compartment without being integrated as exterior walls of the battery module compartment.

14. The battery module of claim 1,
wherein the male joining section is arranged along substantially all of the first edge of the first exterior plate, and
wherein the second joining section is arranged along substantially all of the second edge of the second exterior plate.

15. The battery module of claim 1, wherein, prior to the insertion of the battery module into the battery module compartment, the battery module does not comprise a respective liquid-tight seal.

* * * * *